Sept. 20, 1966  L. ALFILLE  3,274,069
FUEL RODS FOR NUCLEAR REACTORS
Filed June 17, 1963  3 Sheets-Sheet 1

INVENTOR
Lucien ALFILLE
BY
ATTORNEYS

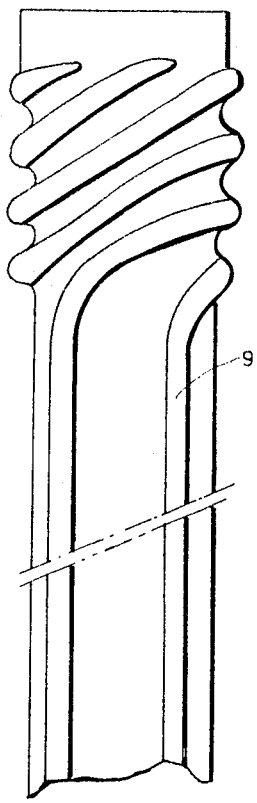
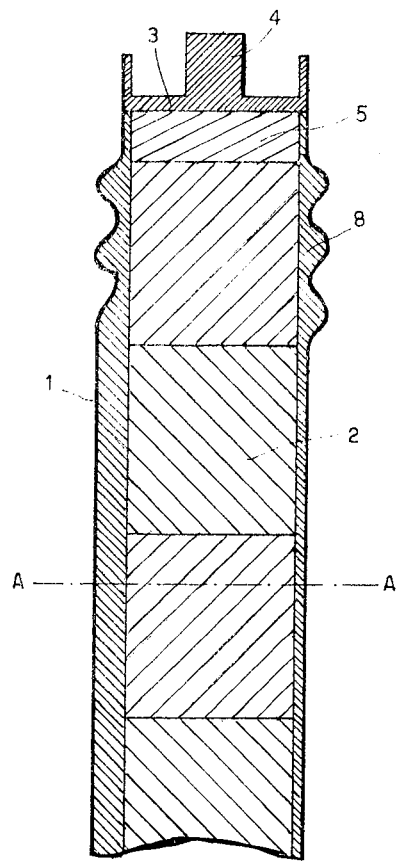
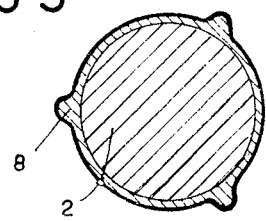
FIG 4        FIG 5
FIG 6

Sept. 20, 1966 L. ALFILLE 3,274,069
FUEL RODS FOR NUCLEAR REACTORS

Filed June 17, 1963 3 Sheets-Sheet 3

INVENTOR
Lucien ALFILLE

BY

ATTORNEYS

United States Patent Office 3,274,069
Patented Sept. 20, 1966

3,274,069
FUEL RODS FOR NUCLEAR REACTORS
Lucien Alfille, Brussels, Belgium, assignor to European Atomic Energy Community-Euratom, Brussels, Belgium
Filed June 17, 1963, Ser. No. 288,081
Claims priority, application Belgium, June 20, 1962, 494,456
9 Claims. (Cl. 176—72)

The instant invention relates to fuel rods for nuclear reactors, particularly power reactors cooled by fluid under pressure, essentially comprising an external cylindrical sheath enclosing a bar or slugs or pellets piled one over the other and made of fissile material; a filler material of good heat conducting quality and of minimum neutron cross-section between the sheath and the fuel and two closure plugs at the ends of the sheath.

It is known that in reactors, particularly in power reactors, acceptable thermal efficiencies are obtained by increasing the outlet temperature of the heat carrying fluid and that this increase causes a rise in temperature of the hot spot of the sheath of the fuel rods or elements.

In this regard, stainless steel is, amongst the usable sheathing materials, the one which offers a good resistance either against various mechanical stresses, or against corrosion due to the usual heat carrying fluids such as carbonic gas, water and water vapour, organic fluids, etc.

As is known, however, such steels have an inconveniently high effective absorption cross-section so that in reactors using natural or slightly enriched uranium, the use of steel sheaths very often becomes prohibitive in regard to neutronic economics.

Indeed, in order to obtain an efficient heat extraction, power reactors are often cooled by a heat carrying fluid under pressure—either in tank-type or pressure-tube type pressurized reactors—and in such a case, the thicknesses necessary for a loose sheath to resist the external pressure are of several tenths of millimeter (0.5 mm. for instance), taking into account the pressure, the rod diameter and the thermo-mechanical stresses induced in the fuel itself. These thicknesses are only possible if the fuel used is enriched uranium.

In order to decrease the thickness of the sheaths, it has already been proposed to use stainless steel which is plated on the fuel by creep at high temperature but there exists, in such a solution, the danger of breaking the sheath because the fuel rod is, in this case, very sensitive to thermal shocks and plastic fatigue as well as to fuel-sheath differential expansion.

Furthermore, the use of ceramic fuel, generally in the form of discs or slugs stacked up one over the other in the sheath, increases the danger of break down, should one of the slugs or pellets crack.

Also, such ceramic fuels as iranium dioxide or uranium carbide, are very sensitive to the effects of thermal shocks consequent to the accidental fall of safety rods.

On the other hand, it is known that rods having a loose sheath—where the fuel in slugs or in pellets is disposed inside the sheath in such a manner that during operation the lateral surface of the ceramic fuel may never force expansion of the sheath to any appreciable extent—have the disadvantage of a high thermal resistance, in the order of 2 to 5° C./w./cm.² and even more, at right angles to the very imperfect contact between the fuel and the sheath. This resistance results in a temperature drop, between these elements, which limit the heat transfer and which becomes important, particularly when it is desired to obtain a high heat flow in the order of 100 w./cm.², for instance.

In order to limit these effects and to ensure a good thermal contact between the sheath and the fuel, it has been proposed to insert a liquid bath such as that of sodium or the sodium-potassium eutectic between the sheath and the slugs or pellets of ceramic fuel.

However, these solutions do not prevent the sheath from having to resist the pressure of the heat carrying fluid which means, in the case of high performance power reactor, that a stainless steel sheath of substantial thickness, in the order of 0.5 mm., for instance, has to be used.

The object of the instant invention is to provide a fuel rod with a steel sheath which, due to its particular design, may extend its field of application, as of now limited to enriched uranium reactors only, to reactors using metallic and ceramic natural uranium fuel. The fuel rod has, furthermore, improved thermal and mechanical characteristics.

The main purpose of the present invention is the provision of a fuel rod of the above mentioned type wherein the steel sheath has a very reduced thickness equivalent, from neutronic standpoint, to other nuclear sheathing material.

Another object of the invention is to provide such a rod with a sheath having means which will allow it to flexibly deform and having viscous filling means between the sheath and fuel such as to allow the sheath to resist high external pressures or substantial internal deformations without being overworked.

A further object of the invention lies in the provision of such a rod with heat conducting filling means which, by providing suitable thermal contact between the sheath and fuel, induces heat transmission between the fuel and sheath.

Still another object of the invention consists in providing such a rod with filling means acting as a trap for fission gases formed by the fuel during cooling of the rod.

The rod is characterized by the fact that the sheath, preferably made of stainless steel, is of reduced thickness and is provided with flexible deformation elements and by the fact that the filling material is constituted by a layer which is viscous at least at the operating temperature. It is further characterized by the fact that the said sheath encloses the fuel assembly and the filling material in such a manner that the whole is stressed at all points by the sheath under hydrostatic conditions, all in such a way that by the deformations of the said elements, the sheath takes on various shapes when adapting itself to the viscous deformation of the filling layer under mechanical and thermal stresses.

A further feature resides in that the thickness of the sheath is smaller than one tenth of a millimeter, preferably in the order of 0.06 to 0.05 mm.

According to a further feature, the filling material is constituted by a metal, preferably magnesium, or an alloy which is plastic at the operating temperatures and which offers a good chemical stability with the fuel and the sheath metal.

Other characteristics and features of the invention will be illustrated as the following description of a preferred non-limitative embodiment is described, having reference to the annexed drawings wherein:

FIGS. 4, 5 and 6 are similar to FIGS. 1, 2 and 3 but refer to another embodiment of the invention;

Figure 1:
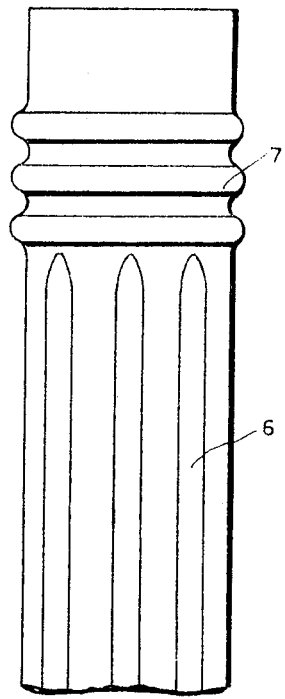
FIGS. 1 and 2 illustrate, respectively, an elevation and a cross-sectional view of a fuel rod made according to the invention.
Figure 2:
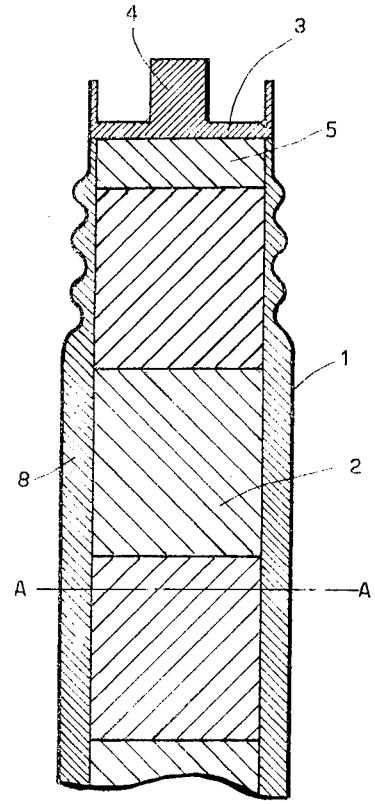
Figure 3:
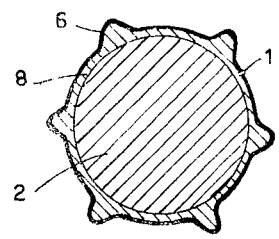
FIG. 3 is a transverse cross-section thereof along line A—A of FIG. 2.

Referring now to FIGS. 1, 2 and 3, 1 designates the cylindrical steel sheath (also called can, clad or jacket)

within which the fuel pellets 2 are stacked up. A plug 3 has a central lug 4 which serves for the engagement of the rod in the grooves or similar assembly means of an adjacent rod of the cluster and a pellet 5 made of refractory material is disposed between the plug and the fuel in order to isolate the end of the rod, which end is a delicate zone.

According to the invention, the thickness of the steel sheath 1 is very small, smaller than one tenth of a millimeter, for instance in the order of 0.05 to 0.06 mm. which is compatible, from a neutronic standpoint, with the fuel from which pellets 2 are made and which is natural uranium, either metallic and preferably lightly alloyed, or ceramic such as uranium dioxide or carbide.

In order to follow the radial and axial flexible deformations of the sheath, the latter is provided with folds 6 and 7 which project outwardly away from the cylindrical body, respectively along the central part and on the ends thereof.

Folds 6, numbering at least three, serve to provide a certain axial stiffness to the sheath, whereas folds 7, provided on one end only of the sheath or on both, serve to take care of the axial deformations in such a manner that the ends act as bellows.

In order that the very thin sheath may resist the stresses induced by the external pressure of the cooling fluid and to avoid a sheath working rate incompatible with its proper behaviour, all the annular space between pellets 2 and sheath 1, including fold cavities 6 and 7, is filled by a metal which forms a viscous layer around fuel 2 and over which sheath 1 adapts itself during its deformation caused by either the external pressure or the thermal deformation of the fuel.

The viscous layer 8 is formed by filling the annular hollow space between fuel 2 and sheath 1, considered in position of rest with its flexible element 6 and 7, with a metal which is preferably plastic at the operating temperatures. This intermediate layer, the minimum thickness of which is a few tenths of a millimeter (for instance 0.5 mm.), is formed by a metal or an alloy which will not appreciably absorb neutrons, has a good thermal conductivity and does not react either with the fuel or with the sheath metal at operating temperatures (chemical stability).

The metal used is preferably magnesium which does not react with uranium oxide or carbide or stainless steel at temperatures up to 550° C.

Filling of the sheath takes place in the following manner:

After the closing plug has been welded to the lower end of the sheath, the latter is placed in an oven in vertical position with the flexing elements 6 and 7 formed thereon in equilibrium position.

The oven is quickly heated to a temperature higher than the fusion point of the plastic filling material which may, for instance, be magnesium. Once this temperature is reached, a quantity of this material, of suitable volume, is then inserted into the sheath in a protective atmosphere of argon, for instance.

Once the plastic material has melted, the fuel pellets are injected one by one in the sheath until the desired levelling of the bath is obtained.

When the assembly has cooled, and after cleaning and removing of the burrs, the upper closure plug is set into place. The plug is normally welded with flanges upstanding.

In order to obtain hydrostatic equilibrium of the sheath, the rod is then raised to 450°–500° C. in an enclosure within which the pressure is increased slowly to allow the folds, by viscous deformation of the hydrostatic layer, to adapt themselves and to start acting as deformable flexible elements.

The small quantity of occluded gas may be removed either by welding the second plug under vacuum or by chemical reaction and absorption of the gas in the hydrostatic layer 8.

Magnesium is preferably used to constitute the hydrostatic layer because it can act as a good trap or "getter" for the absorption of occluded gases such as the fission gases formed during the cooling of the fuel rod after a high combustion or "burn-up" rate.

In operation in the reactor, the fuel being surrounded by and working in the heat carrying fluid under pressure, the latter fluid compresses the sheath so that the folds thereof tend to flatten out in such a way that the sheath takes on a configuration corresponding to the hydrostatic equilibrium between the viscous layer and the external fluid, at the pressure of the latter.

The sheath responds in the same manner in regard to the expansions of the fuel and of the freed fission gases because, even in this situation, the folds, in opening up, act as a reserve of elasticity.

Another embodiment of the rod is illustrated in FIGS. 4, 5 and 6 wherein the same elements are identified by the same reference numerals.

In this embodiment, in order to improve the mechanical behaviour of the thin sheath at the level of the transition zone between the longitudinal folds 6 and the transverse folds 7, zone which tends to be weakened because of the sudden passage from one type of folds to the other, there is provided a single system of undulations.

As can be seen in FIGS. 4 and 5, folds 9 run first in an axial extent and then wind into a helix comprising several threads having as coarse a pitch as possible.

Figures 7, 8:
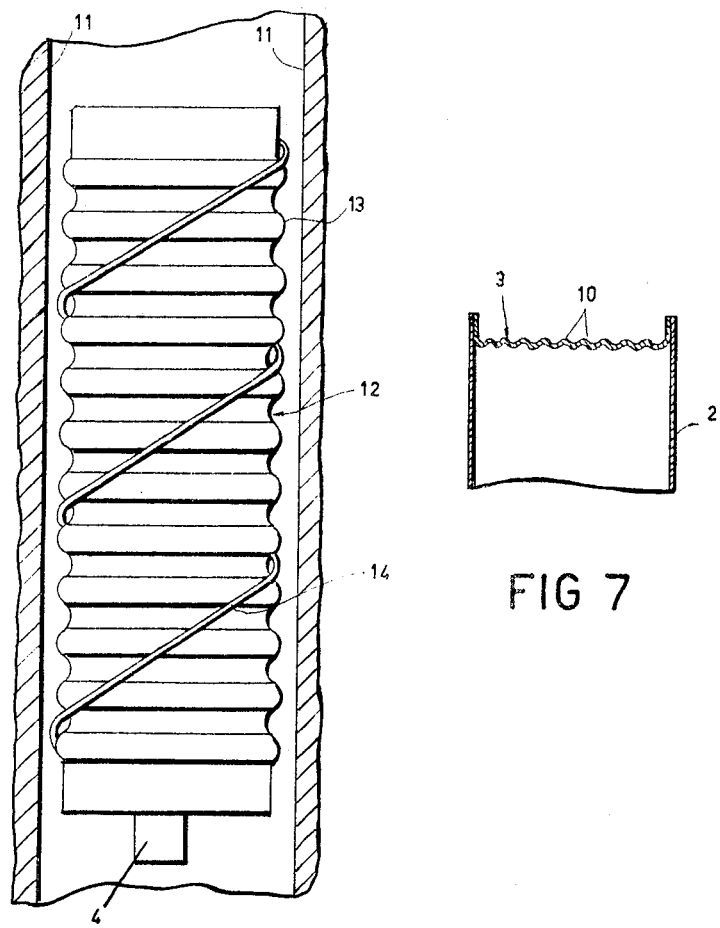
FIG. 7 is a cross-sectional view of a closing plug for a rod.
FIG. 8 is an elevation view of another embodiment of rods according to the invention, shown in the pressure tube of a moderated reactor.

In order to simplify the fabrication of the sheath by avoiding the making of transverse folds and threads of a helix, a limited axial flexibility may be obtained, as can be seen in FIG. 7, by making the plug with the portion which constitutes the bottom of the sheath, of a small thickness and provided with circular corrugations 10.

The plugs are preferably machined from a circular disc made of stainless or of a material identical to that of the sheath if the latter is of refractory steel. They are welded to the sheath with edges upstanding, either under vacuum or by argon arc.

The upstanding edge of the plug is preferably welded to the sheath to limit the work of tightly welding the plugs.

As mentioned above, longitudinal folds 6 of the embodiment of FIGS. 1, 2 and 3 and the rectilinear portion of folds 9 of the embodiment of FIGS. 4, 5 and 6 serve, to a certain extent, to provide the rod with axial rigidity, the stiffness of the rod being very limited because of the flexibility of the sheath.

In accordance with the invention, in order to prevent undue deformation of the rods, it is necessary, during assembly, to insert between the rods in the sub-channels of the cluster, complete or partial stiffening members, such as graphite structures, for instance.

As shown in FIG. 8, illustrating a rod inside a heavy water or graphite moderated reactor, the stiffening elements 11 define a fixed geometrical space near rod 12 which allows it limited radial movements.

According to the embodiment illustrated in FIG. 8, the steel sheath is made in the form of a bellows 13. In this solution, axial as well as radial flexibility is obviously due to the extreme flexibility of the sheath.

Thread 14, made of thin steel or oxidized sintered aluminum, secured at one end only of the rod is wound on the latter and acts as spacing wedge to allow free axial expansion of the sheath.

It should be noted that the steel sheath is used in thicknesses which are equivalent to aluminum, from a neutronic point of view.

This makes it possible to use steel sheaths in all reactors where the fuel may either be metallic natural uranium, preferably lightly alloyed in order to improve its characteristics, or ceramic such as uranium dioxide or carbide.

Furthermore, the thickness of the sheath is not critical because the action of the sheath in permanent operation under the pressure of the cooling fluid is extremely small due to the use of the hydrostatic plastic layer which makes it possible to use a cooling fluid at as high a pressure as is desired.

Furthermore, the layer reduces the temperature drops between fuel and sheath and this considerably improves the heat exchange making it possible to obtain a greater heat output and improving at the same time the performance of the fuel particularly if it is made of a ceramic material.

From this, it follows that for a given operating load of the fuel, the temperature at the heart of the fuel becomes as low as is possible particularly in comparison with fuel rods made of ceramic material and having a loose sheath.

Furthermore the thinness of the steel sheath and the excellent heat contact between the latter and the fuel through the conductive plastic layer considerably reduces the effect of the thermal shocks and therefore also the risk of creating hot spots during operation of the sheath.

It should also be noted that, even though in the proposed arrangement the ceramic fuel pellets are disposed in their best condition of use, they may either be displaced or cracked or break up without causing breakage of the sheath, considering the mode of operation of the sheath as working in a hydrostatic condition.

It may still be noted that, in operation, the fission gases given off at the end of a high burning rate are balanced by the pressure of the cooling fluid whereas during cooling the trapping effect of the gases in the conductive plastic layer heavily decreases the internal pressure in the sheath consequent to the presence of these gases.

Again, it should be noted that the temperatures of the hot spot of the proposed sheath are limited exclusively by the temperatures allowed with the use of stainless steel, for instance in the cooling fluid considered, taking into account the compatibility with this fluid at the given temperature.

The invention has been described with reference to particular embodiments; it is however obvious that it should not be limited to the latter and that variations and modifications are possible within the scope of the invention. For instance, in the embodiments where axial flexibility is obtained by the plug, the latter may be formed as bellows projecting inwardly.

I claim:
1. A fuel element for nuclear reactors cooled by a heat-carrying pressurized fluid, comprising:
 a mechanically expansible and contractible elastic steel sheath having a thickness smaller than 0.1 mm.;
 said sheath formed with means to allow axial and radial expansion and contraction thereof;
 nuclear fuel material within said sheath and surrounded by the said sheath with a clearance greater than one tenth of one millimeter;
 plugs closing the ends of said sheath;
 a heat conductive filling material having a minimum neutron cross section and viscous at least at the operating temperatures of said reactor, said filling material completely filling any space between said sheath, plugs and fuel material and balancing by hydrostatic deformation thereof the pressure of the said heat carrying pressurized fluid acting externally upon said sheath for any mechanical and thermal stresses induced by the said fuel material.

2. A fuel rod as claimed in claim 1, wherein the thickness of the sheath is between 0.05 and 0.06 mm.

3. A fuel rod as claimed in claim 1, wherein the filling material is a metal which, at the operating temperatures of the rod, is plastic and has a good chemical stability in regard to the fuel and the metal of the sheath.

4. A fuel rod as claimed in claim 1, wherein the filling material is an alloy which, at the operating temperatures of the rod, is plastic and has a good chemical stability in regard to the fuel and the sheath metal.

5. A fuel rod as claimed in claim 1, wherein the filling material is magnesium.

6. A fuel rod as claimed in claim 1, wherein the flexible deformation elements are constituted by longitudinal parallel folds provided in the cylindrical portion of the sheath comprised between the terminal portions thereof and circumferential folds on at least one terminal portion of said sheath.

7. A fuel rod as claimed in claim 1, wherein, the flexible deformation elements are constituted by parallel folds provided on the cylindrical sheath, each fold having a central longitudinal portion which terminates into a transverse helix at at least one of the ends of said sheath.

8. A fuel rod as claimed in claim 1, wherein the flexible deformation elements are in the form of bellows.

9. A fuel rod as claimed in claim 1, wherein the closure plugs are sheet-like in nature and provided with concentric corrugations for flexible radial deformation, the deformation elements of the sheath being constituted by longitudinal parallel folds provided between the closure plugs.

References Cited by the Examiner

UNITED STATES PATENTS

| | | | |
|---|---|---|---|
| 2,886,503 | 5/1959 | Szilard et al. | 176—72 X |
| 3,034,975 | 5/1962 | Beurtheret | 176—81 X |
| 3,085,059 | 4/1963 | Burnham | 176—73 |
| 3,085,954 | 4/1963 | Stohr et al. | 176—73 |

FOREIGN PATENTS

| | | |
|---|---|---|
| 1,244,632 | 9/1960 | France. |
| 908,857 | 10/1962 | Great Britain. |
| 911,466 | 11/1962 | Great Britain. |

OTHER REFERENCES

Hoyaux; "Proceedings of the International Conference on the Peaceful Uses of Atomic Energy," vol. 9, 1955. United Nations, New York, p. 303.

Wright; "Metallurgy in Nuclear Power Technology," Prentice-Hall Inc., Englewood Cliffs, New Jersey, 1962, pp. 109, 110.

L. DEWAYNE RUTLEDGE, *Primary Examiner.*

REUBEN EPSTEIN, *Examiner.*

R. L. GRUDZIECKI, *Assistant Examiner.*